(12) United States Patent
Matsumoto

(10) Patent No.: US 9,765,814 B2
(45) Date of Patent: Sep. 19, 2017

(54) LINEAR MOTION GUIDE DEVICE AND PRODUCTION METHOD THEREFOR

(71) Applicant: NSK Ltd., Shinagawa-ku, Tokyo (JP)

(72) Inventor: Jun Matsumoto, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 15/100,744

(22) PCT Filed: Nov. 26, 2014

(86) PCT No.: PCT/JP2014/005917
§ 371 (c)(1),
(2) Date: Jun. 1, 2016

(87) PCT Pub. No.: WO2015/083347
PCT Pub. Date: Jun. 11, 2015

(65) Prior Publication Data
US 2016/0305477 A1 Oct. 20, 2016

(30) Foreign Application Priority Data

Dec. 2, 2013 (JP) ................................. 2013-249481

(51) Int. Cl.
*F16C 29/06* (2006.01)
*F16C 33/58* (2006.01)
(Continued)

(52) U.S. Cl.
CPC ............ *F16C 29/0642* (2013.01); *B24D 5/14* (2013.01); *F16C 29/0604* (2013.01);
(Continued)

(58) Field of Classification Search
CPC .............. F16C 29/0642; F16C 29/0604; F16C 29/0647; F16C 33/585; F16C 33/64
See application file for complete search history.

(56) References Cited

U.S. PATENT DOCUMENTS 4,693,040 A * 9/1987 Teramachi .......... F16C 29/0602
29/898.03
4,898,478 A * 2/1990 Osawa ................ F16C 29/0647
384/45
(Continued)

FOREIGN PATENT DOCUMENTS

CN 101233335 A 7/2008
JP 63-180437 A 7/1988
(Continued)

OTHER PUBLICATIONS

Extended European Search Report issued in counterpart European Application No. 14866828.8 dated Mar. 10, 2017 (seven (7) pages).
(Continued)

*Primary Examiner* — Thomas R. Hannon
(74) *Attorney, Agent, or Firm* — Crowell & Moring LLP

(57) ABSTRACT

There are provided: a linear motion guide device, which enhances workability of raceway surfaces and is capable of reducing production cost; and a production method for the linear motion guide device. For this purpose, a linear motion guide device includes a guide rail (1), a slider (2), and a plurality of rolling elements (4), and the guide rail (1) and the slider (2) individually have raceway surfaces (11, 21), which form a rolling path (3) of the rolling elements (4), at positions opposite to each other. Then, the rolling elements (4) are disposed in the rolling path (3), and the slider (2) moves with respect to the guide rail (1) via the rolling elements (4). The raceway surface (21) of at least one of the slider (2) and the guide rail (1) is composed of: a first raceway surface (21A); and second raceway surfaces (21B) extending on both sides of the first raceway surface (21), and surface roughness of the second raceway surfaces (21B) is set rougher than surface roughness of the first raceway surface (21A).

4 Claims, 8 Drawing Sheets

(51) Int. Cl.
*B24D 5/14* (2006.01)
*F16C 33/64* (2006.01)
*F16C 33/62* (2006.01)

(52) U.S. Cl.
CPC ........ *F16C 29/0647* (2013.01); *F16C 33/585* (2013.01); *F16C 33/64* (2013.01); *F16C 33/62* (2013.01); *F16C 2240/54* (2013.01)

(56) References Cited

U.S. PATENT DOCUMENTS

| | | | | |
|---|---|---|---|---|
| 6,142,671 | A * | 11/2000 | Ise | F16C 29/0602 384/45 |
| 6,508,589 | B2 * | 1/2003 | Kashiwagi | B21H 7/187 384/49 |
| 6,808,309 | B2 * | 10/2004 | Greiner | F16C 29/0602 384/45 |
| 6,984,068 | B2 * | 1/2006 | Kato | F16C 29/06 384/43 |
| 2005/0281496 | A1 * | 12/2005 | Takahashi | F16C 29/065 384/13 |
| 2010/0158420 | A1 * | 6/2010 | Michioka | B24B 1/00 384/45 |

FOREIGN PATENT DOCUMENTS

| | | |
|---|---|---|
| JP | 5-220669 A | 8/1993 |
| JP | 8-328376 A | 12/1996 |
| JP | 2002-130271 A | 5/2002 |
| JP | 2006-105197 A | 4/2006 |
| JP | 2008-175363 A | 7/2008 |
| JP | 2009-208179 A | 9/2009 |
| JP | 2013-174339 A | 9/2013 |

OTHER PUBLICATIONS

International Search Report (PCT/ISA/210) issued in PCT Application No. PCT/JP2014/005917 dated Mar. 3, 2015 with English translation (four pages).
Japanese-language Written Opinion (PCT/ISA/237) issued in PCT Application No. PCT/JP2014/005917 dated Mar. 3, 2015 (four pages).
International Preliminary Report on Patentability (PCT/IB/338 & PCT/IB/373) issued in PCT Application No. PCT/JP2014/005917 dated Jun. 16, 2016, including English translation of document C2 (Japanese-language Written Opinion (PCT/ISA/237)) previously filed on Jun. 1, 2016 (seven pages).
Chinese Office Action issued in counterpart Chinese Application No. 201480054287.4 dated May 15, 2017 with English-language translation (fourteen (14) pages).

* cited by examiner

LINEAR MOTION GUIDE DEVICE AND PRODUCTION METHOD THEREFOR

TECHNICAL FIELD

The present invention relates to a linear motion guide device and a production method therefor.

BACKGROUND ART

Heretofore, a linear motion guide device has included a guide rail, a slider, and a plurality of rolling elements. Then, the guide rail and the slider individually have raceway surfaces, which form a rolling path of the rolling elements, at positions opposite to each other. These raceway surfaces extend in a longitudinal direction of the guide rail, the rolling elements (for example, steel balls) are disposed on the rolling path, and the slider moves with respect to the guide rail via the rolling elements.

In the linear motion guide device as described above, the raceway surfaces are ground by an integrally molded grindstone (refer to Patent Literature 1). Then, for the purpose of suppressing friction and heat generation at a time of such grinding, a technology of setting a maximum inclination of a rail grinding surface to 10° or more from the horizon is disclosed in Patent Literature 2. Moreover, in Patent Literature 3, a linear motion guide device in which roughness is changed for each of the raceway surfaces is disclosed.

CITATION LIST

Patent Literature

PTL 1: JP S63-180437 A
PTL 2: JP 2008-175363 A
PTL 3: JP 2002-130271 A

SUMMARY OF INVENTION

Technical Problem

However, in the technology described in Patent Literature 2, a shape of peripheries of the raceway surfaces is limited so that such an inclination from the horizontal direction can be 10° or more, accordingly, design of the shape of the raceway surfaces is limited, and therefore, there has been room for consideration.

Moreover, in the technology described in Patent Literature 3, as methods for controlling the roughness of the raceway surfaces, superfinishing/running-in are disclosed; however, it is necessary to implement these methods in another step after the raceway surfaces are ground. Hence, the number of steps is increased to increase cost in some case, and there has been room for consideration.

The present invention has been made by focusing on the problems described above, and it is an object of the present invention to provide a linear motion guide device, which enhances workability of the raceway surfaces and is capable of reducing production cost, and to provide a production method for the linear motion guide device.

Solution to Problem

A certain aspect of the linear motion guide device for solving the problem is a linear motion guide device, which includes a guide rail, a slider, and a plurality of rolling elements, in which, the guide rail and the slider individually have raceway surfaces, which form a rolling path of the rolling elements, at positions opposite to each other, the raceway surfaces extend in a longitudinal direction of the guide rail, the rolling elements are disposed in the rolling path, and the slider moves with respect to the guide rail via the rolling elements, and the raceway surface of at least one of the slider and the guide rail is composed of: a first raceway surface extending in the longitudinal direction; and second raceway surfaces extending on both sides in the longitudinal direction of the first raceway surface, and surface roughness of the second raceway surfaces is set rougher than surface roughness of the first raceway surface.

Here, in the linear motion guide device, preferably, center line average roughness of the second raceway surfaces is 1.5 to 3 times center line average roughness of the first raceway surface.

A certain aspect of a production method for a linear motion guide device for solving the problem is a production method for a linear motion guide device, which includes a surface processing step of implementing surface processing for a raceway surface extending along a longitudinal direction of at least one of a slider and a guide rail, and an assembly step of disposing a plurality of rolling elements in a rolling path for rolling elements, which is formed of the raceway surface of the slider and the raceway surface of the guide rail, which is provided opposite to the raceway surface of the slider, and assembling the guide rail and the slider with each other so that the slider can be movable with respect to the guide rail via the rolling elements, in which the surface processing step is a step of performing the surface processing at one time by a same grindstone so that the raceway surface of at least one of the slider and the guide rail includes a first raceway surface extending in the longitudinal direction, and a second raceway surface extending on both sides of the longitudinal direction of the first raceway surface, and that surface roughness of the second raceway surfaces is rougher than surface roughness of the first raceway surface.

Moreover, preferably, the production method for a linear motion guide device further includes: a grindstone molding step of molding the grindstone by a rotary dresser, wherein a protrusion amount of abrasive grains or a grain diameter of the abrasive grains in regions of the rotary dresser, the regions corresponding to the second raceway surfaces, is made larger than a protrusion amount of the abrasive grains or a grain diameter of the abrasive grains in a region corresponding to the first raceway surface.

Advantageous Effects of Invention

In accordance with the aspect of the present invention, there can be provided: the linear motion guide device, which enhances the workability of the raceway surfaces and is capable of reducing the production cost; and the production method for the linear motion guide device.

DESCRIPTION OF EMBODIMENTS

In the following detailed description, many specific details are described so as to provide perfect understanding of embodiments of the present invention. However, it will be obvious that one or more embodiments can be embodied without such specific details. In addition, in order to simplify the drawings, well-known structures and devices are illustrated by simplified diagrams.

A description is made below of embodiments of a linear motion guide device with reference to the drawings.

First Embodiment

<Configuration of Linear Motion Guide Device>

Figure 1:
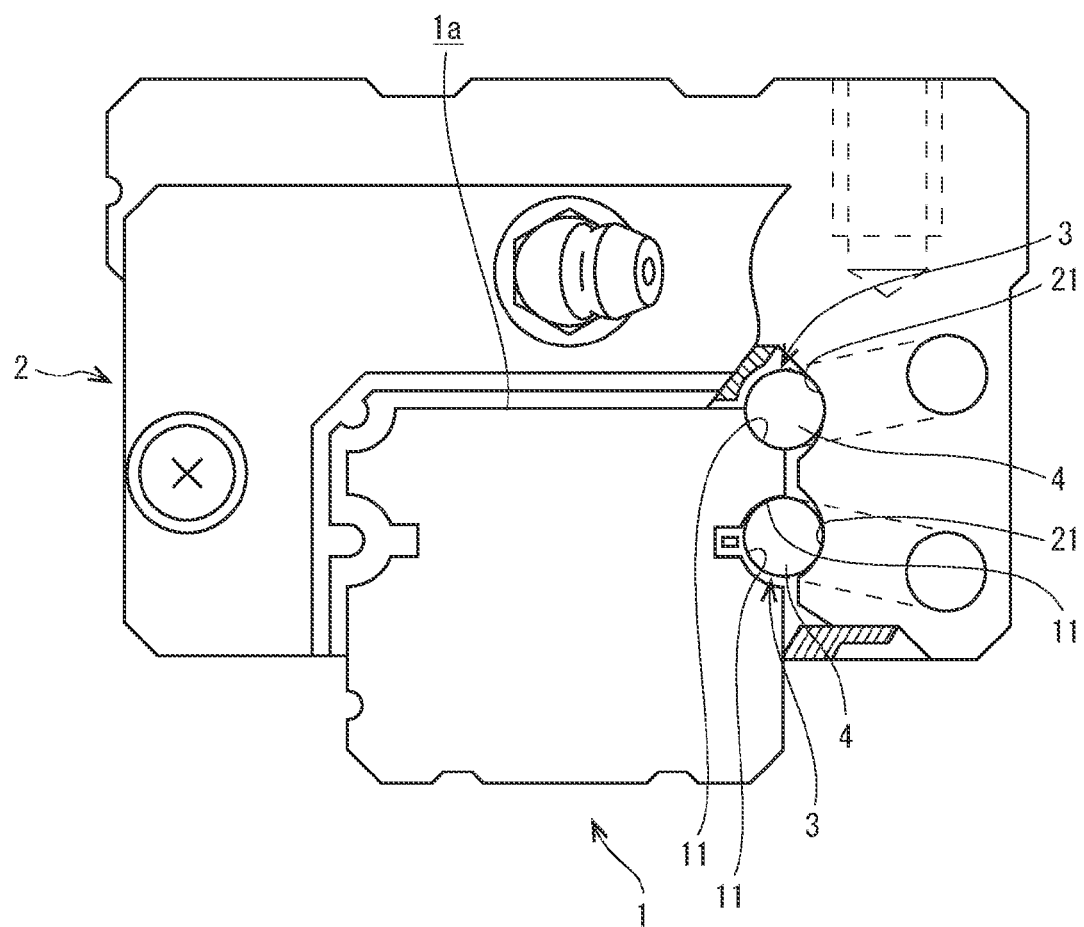
FIG. 1 is a cross-sectional view along a width direction, illustrating a configuration in a first embodiment of a linear motion guide device.

FIG. 1 is a cross-sectional view along a width direction, illustrating a configuration in a certain embodiment of the linear motion guide device.

As illustrated in FIG. 1, the linear motion guide device of this embodiment includes: a guide rail 1 that extends linearly in a longitudinal direction; and a slider 2 that straddles the guide rail 1. In the guide rail 1, attachment holes (not illustrated) for inserting therethrough bolts which penetrate the same guide rail 1 in a height direction from an upper surface 1a thereof to a lower surface thereof are drilled at a predetermined interval in the longitudinal direction.

On both side surfaces in a width direction of the guide rail 1, raceway surfaces 11 and 11 formed along the longitudinal direction are provided in two lines in the height direction. Moreover, on inner side surfaces in a width direction of the slider 2, raceway surfaces 21 and 21 are provided in two lines in the height direction so as to be opposed to the raceway surfaces 11.

In the raceway surfaces 11 and the raceway surfaces 21, cross sections thereof in a width direction (direction perpendicular to the longitudinal direction and the height direction) form a substantially circular-arc groove shape. Then, a rolling path 3 is composed of the raceway surfaces 11 and the raceway surfaces 21, which are installed opposite to each other. Into this rolling path 3, a plurality of rolling elements (for example, steel balls) 4 are inserted so as to be freely rollable. The linear motion guide device of this embodiment is configured as described above, whereby the slider 2 is made relatively movable along the longitudinal direction of the guide rail 1 via the plurality of rolling elements 4.

Figure 2:
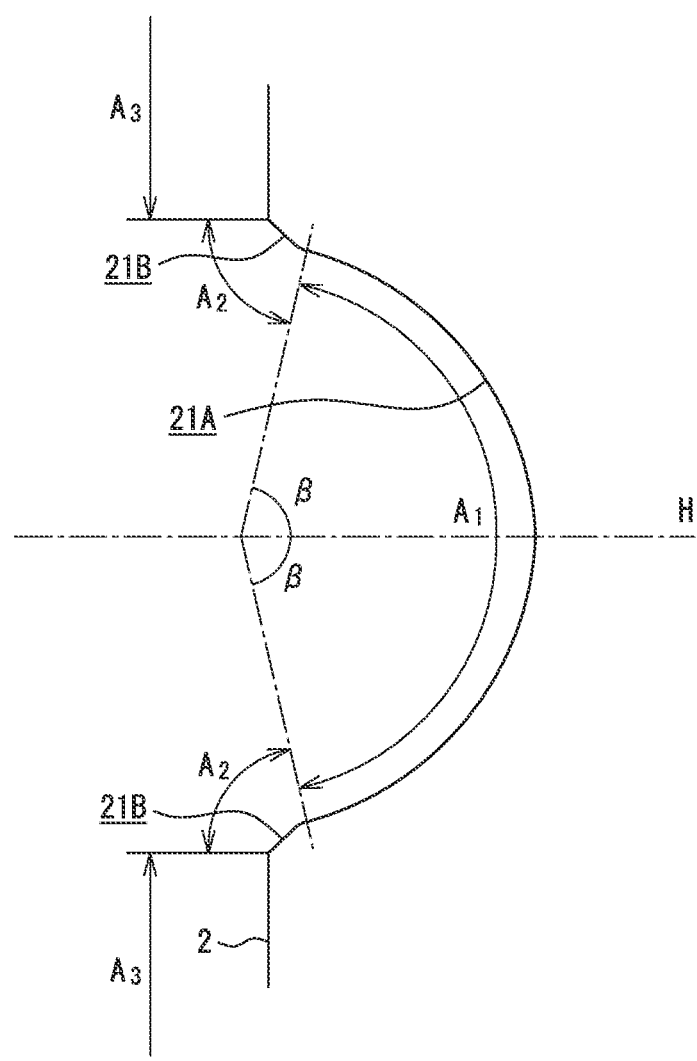
FIG. 2 is a cross-sectional view along the width direction, illustrating a configuration of a raceway surface in the first embodiment of the linear motion guide device.

Here, as illustrated in FIG. 2, each of the raceway surfaces 21 of the slider 2 is composed of: a first raceway surface 21A extending along the longitudinal direction; and second raceway surfaces 21B and 21B defined on both sides of this first raceway surface 21A. Note that, in FIG. 2, in the raceway surface 21 ground in the slider 2, a region defined by the first raceway surface 21A is denoted by "$A_1$", a region defined by the second raceway surfaces 21B is denoted by "$A_2$", and an unground region is denoted by "$A_3$".

Moreover, preferably, the region "$A_1$" defined by the first raceway surface 21A is formed as a region in which an angle β is 77° or less, the angle β being made along the raceway surface 21 while taking, as a reference, a reference surface H that bisects the raceway surface 21 along the width direction of the slider.

Moreover, surface roughness of the second raceway surfaces 21B is set rougher than surface roughness of the first raceway surface 21A. For example, the surface roughness (center line average roughness) $Ra_1$ of the first raceway surface 21A ranges approximately from 0.2 μm to 1.6 μm. Moreover, preferably, surface roughness (center line average roughness) $Ra_2$ of the second raceway surfaces 21B ranges approximately from 1.5 to 3 times the surface roughness $Ra_1$ of the first raceway surface 21A.

As described above, the raceway surface 21 of the slider 2 is composed of the first raceway surface 21A and the second raceway surfaces 21B, and the surface roughness $Ra_2$ of the second raceway surfaces 21B is set rougher than the surface roughness $Ra_1$ of the first raceway surface 21A, whereby workability of the second raceway surfaces 21B is good, and the surface roughness of the first raceway surface 21A can keep an appropriate value. Hence, a linear motion guide device free from a performance decrease can be provided.

<Production Method for Linear Motion Guide Device>

A description is made below of a production method for the linear motion guide device of this embodiment with reference to the drawings. The production method for the linear motion guide device of this embodiment includes: a surface processing step of implementing surface processing for a raceway surface extending along a longitudinal direction of a slider; and an assembly step.

Then, the surface processing step is a step of performing the surface processing at one time by the same grindstone so that the raceway surface of at least one of the slider and the guide rail can be composed of the first raceway surface extending in the longitudinal direction and the second raceway surfaces extending on both sides in the longitudinal direction of the first raceway surface, and that the surface roughness $Ra_2$ of the second raceway surfaces 21B can be rougher than the surface roughness $Ra_1$ of the first raceway surface 21A.

Moreover, the assembly step is a step of disposing a plurality of rolling elements in a rolling path for rolling elements, which is formed of the raceway surface of the slider and the raceway surface of the guide rail, which is provided opposite to the raceway surface of the slider, and assembling the guide rail and the slider with each other so that the slider can be movable with respect to the guide rail via these rolling elements.

Note that the longitudinal direction of the slider is a direction parallel to a longitudinal direction of the guide rail in an event where the slider is assembled with the guide rail.

Figure 3:
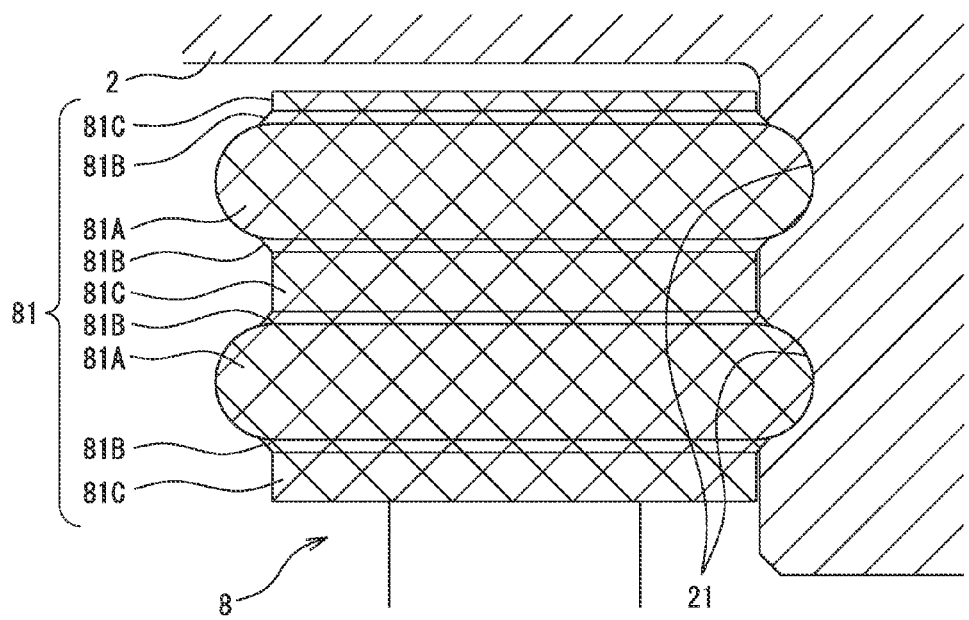
FIG. 3 is a cross-sectional view along the width direction, illustrating a processing step for a raceway surface of a slider in a first embodiment of a production method for a linear motion guide device.
Figure 4:
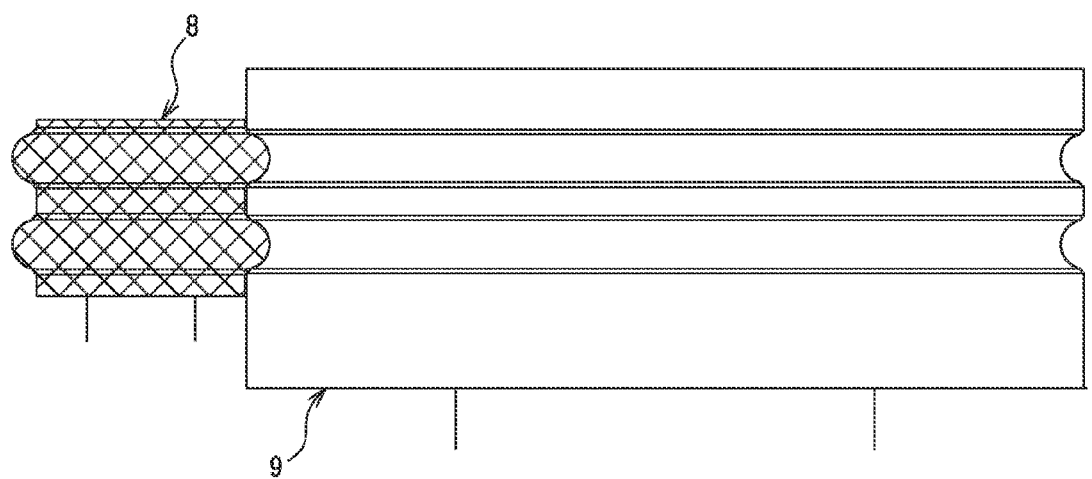
FIG. 4 is a cross-sectional view along the width direction, illustrating a grindstone molding step in the first embodiment of the production method for a linear motion guide device.

As illustrated in FIG. 3, in this step, there is used a grindstone 8 in which a plurality of grindstone portions 81 and 81, each of which has an outer surface 81a forming surfaces (not illustrated) for transferring the first raceway surface 21A and the second raceway surface 21B, are molded integrally with each other, and the raceway surfaces 21 and 21 of the slider 2 are subjected to grinding finish by moving the grindstone portions 81 and 81 in the longitudinal direction. Each of the grindstone portions 81 is composed of: first processed portions 81A; second processed portions 81B provided on upper and lower surfaces along a rotation axis of the grindstone 8; and third processed portions 81C provided between the second processed portion 81. Note that, as illustrated in FIG. 4, this grindstone 8 is molded in such a manner that the grindstone portion 81 is subjected to accurate truing by a rotary dresser 9.

Figure 5A:
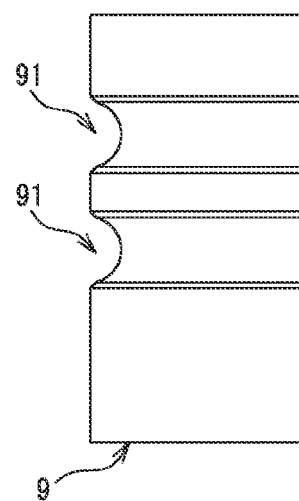
FIG. 5A is a side view illustrating a configuration of a rotary dresser for use in the grindstone molding step in the first embodiment of the production method for a linear motion guide device.
Figure 5B:
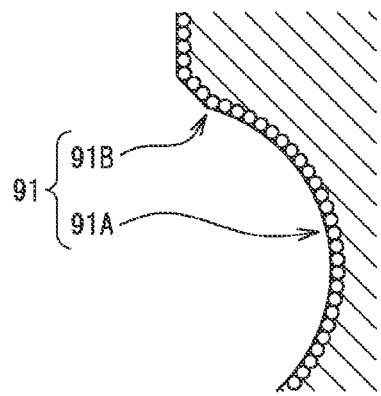
FIG. 5B is a principal portion enlarged view of FIG. 5A.

Here, as illustrated in FIG. 5A, the rotary dresser 9 has forming portions 91 and 91 for forming the grindstone portions 81 and 81. As illustrated in FIG. 5B, each of these forming portions 91 is composed of: a first surface 91A that forms a shape of transferring the first raceway surface 21A and the second raceway surfaces 21B; and second surfaces 91B which form a shape of transferring the second raceway surfaces 21B.

Each of the forming portions 91 thus composed is configured in such a manner that abrasive grains 93 are arrayed with a desired shape on a surface thereof and are integrated with one another by a bond layer such as plating. As the abrasive grains 93, there are mentioned brown alumina, white alumina, pink alumina, pulverized alumina, artificial emery, alumina zirconia, black silicon carbide, green silicon carbide, diamond, and cubic boron nitride. As the diamond, there are mentioned natural diamond, single crystal diamond, and polycrystalline diamond. Among them, diamond, which is more excellent than others in heat resistance and abrasion resistance, is suitable as the abrasive grains 93.

Figure 6:
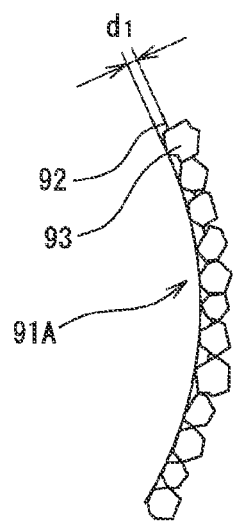
FIG. 6 is an enlarged view of a first processed portion of FIG. 5B.

Next, a description is made of the first surface 91A, which is illustrated in FIG. 5B, with reference to FIG. 6. As illustrated in FIG. 6, a particle diameter of the abrasive grains 93 using diamond have variations. An average grain diameter of the abrasive grains 93 for which diamond is used ranges approximately from 50 μm to 300 μm. Then, on the first surface 91A, a protrusion amount $d_1$ of the abrasive grains 93 using diamond ranges approximately from 20 μm to 200 μm. This protrusion amount $d_1$ is a dimension of the abrasive grains 93 protruding from a bond layer 92 of the first surface 91A. This protrusion amount $d_1$ also has variations among the abrasive grains 93. Accordingly, in this embodiment, the protrusion amount of the abrasive grains 93 is defined by an average protrusion amount.

Figure 7:
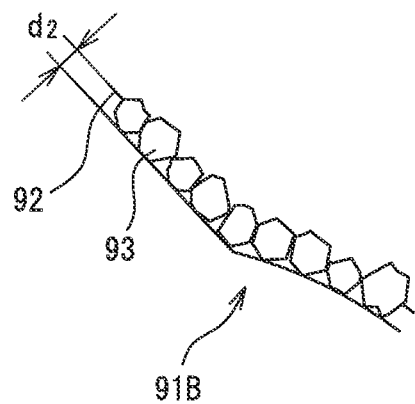
FIG. 7 is an enlarged view of a second processed portion of FIG. 5B.

Next, a description is made of the second surface 91B, which is illustrated in FIG. 5B, with reference to FIG. 7. As illustrated in FIG. 7, a protrusion amount $d_2$ of the abrasive grains 93 on the second surface 91B for forming the second raceway surface 21B is set larger than the protrusion amount $d_1$ of the abrasive grains 93 on the first surface 91A. This protrusion amount $d_2$ is also a dimension of the abrasive grains 93 protruding from the bond layer 92 of the second surface 91B. Note that the average grain diameter of the abrasive grains 93 which compose the second surface 91B is substantially the same as the average grain diameter of the abrasive grains 93 which compose the first surface 91A. Meanwhile, preferably, the protrusion amount $d_2$ of the second surface 91B ranges approximately from 1.5 to 3 times the protrusion amount $d_1$ of the first surface 91A.

Figure 8A:
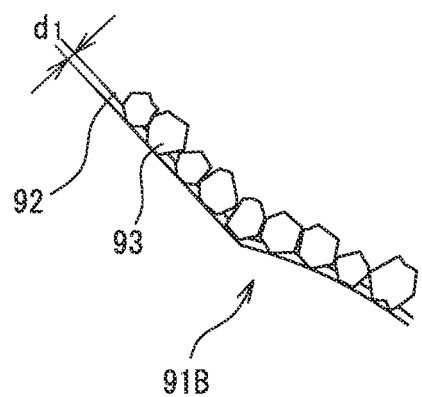
FIGS. 8A and 8B are views illustrating a fabrication method for the rotary dresser for use in the grindstone molding step in the first embodiment of the production method for a linear motion guide device.
Figure 8B:
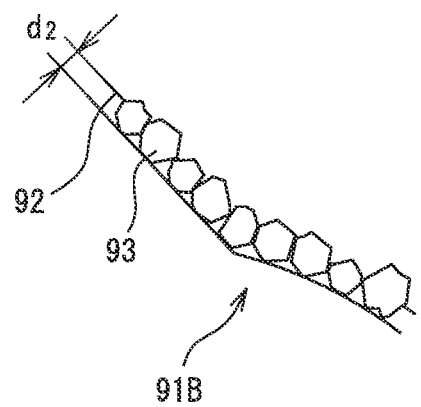

Next, a description is made of a production method for the rotary dresser with reference to FIGS. 8A and 8B. As illustrated in FIG. 8A, the rotary dresser 9 for forming the grindstone for use in this embodiment is fabricated by uniformly arraying the abrasive grains 93 (for example, diamond) on a surface of a base material. A protrusion amount $d$ ($=d_1$) of the abrasive grains 93 at this time ranges approximately from 20 μm to 200 μm on both of the first surface 91A and the second surface 91B (note that the second surface 91B is illustrated in FIG. 8A).

Thereafter, as illustrated in FIG. 8B), the bond layer 92 (refer to FIG. 6 and FIG. 7) is dissolved only for the second surface 91B. In such a way, the protrusion amount of the abrasive grains 93 of the second surface 91B can be set larger than the protrusion amount of the abrasive grains 93 of the first surface 91A. Here, when the bond layer is dissolved too much, the abrasive grains 93 become prone to fall off. Moreover, when such dissolution of the bond layer 92 is insufficient, the protrusion amount of the abrasive grains 93 does not change very much between the first surface 91A and the second surface 91B.

In this connection, suitably, the protrusion amount $d_2$ of the abrasive grains 93 on the second surface 91B ranges approximately from 1.5 to 3 times the protrusion amount $d_1$ of the abrasive grains 93 on the first surface 91A.

In this production method for the rotary dresser, the grain diameter of the abrasive grains 93 which compose the rotary dresser 9 is uniform everywhere. Therefore, there is an advantage that the rotary dresser 9 can be fabricated relatively easily.

Figure 9:
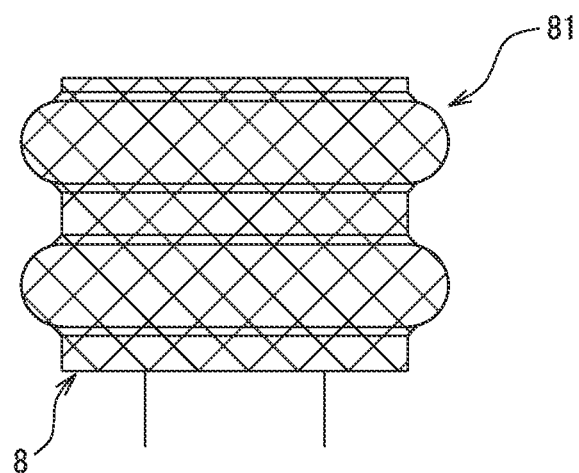
FIG. 9 is a front view illustrating a configuration of a grindstone in the first embodiment of the production method for a linear motion guide device.

Next, a description is made of the grindstone molded by this rotary dresser 9 with reference to FIG. 9. The surface processing step in the production method for the linear motion guide device of this embodiment is a step of rotating this grindstone 8, allowing the grindstone portions 81 and 81 to abut against the raceway surface 21 of the slider 2, and thereby grinding the first raceway surface 21A and the second raceway surface 21B.

Figure 10:
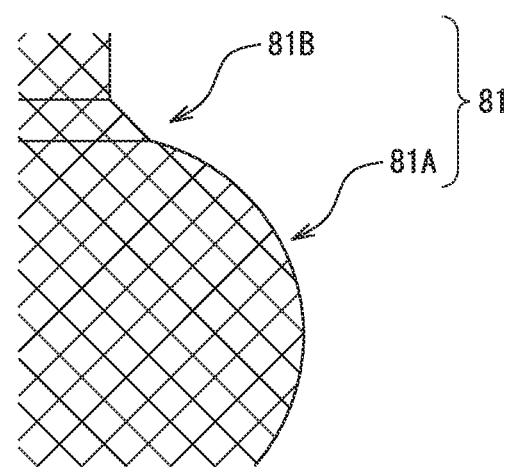
FIG. 10 is an enlarged view of FIG. 9.

Here, as illustrated in FIG. 10, in the grindstone portion 81, with regard to the second processed portion 81B that grinds the second raceway surface 21B, a distance thereof from a rotation center of the grindstone 8 is smaller in comparison with that of the first processed portion 81A that grinds the first raceway surface 21A. Hence, with regard to the second processed portion 81B that serves as a grindstone and grinds the second raceway surface 21B, a circumferential velocity thereof becomes smaller in comparison with that of the first processed portion 81A that grinds the first raceway surface 21A. Therefore, a grinding capability of the second processed portion 81B will be decreased in comparison with a grinding capability of the first processed portion 81A.

This difference of the grinding capability between the first processed portion 81A and the second processed portion 81B sometimes requires a long time to perform the grinding, and sometimes causes an occurrence of degradation (tempering or the like) due to heat as a result of an increase of heat generation.

However, in this embodiment, as mentioned above, the protrusion amount $d_2$ of the abrasive grains 93 on the second surface 91B of the rotary dresser 9 is set larger than the protrusion amount $d_1$ of the abrasive grains 93 on the second surface 91A thereof. With regard to the grindstone portion 81 of the grindstone 8 molded by the rotary dresser 9 designed as described above, the surface roughness of the first processed portion 81A is made smaller than the surface roughness of the second processed portion 81B.

Hence, in this embodiment, there is exerted such an effect that grindability of the second processed portion 81B is enhanced to prevent a significant occurrence of the difference of the grinding capability between the first processed portion 81A and the second processed portion 81B.

As described above, with regard to the grindstone 8 for use in this embodiment, the grindstone portion 81 that grinds the raceway surface 21 of the slider 2 is composed of the first processed portion 81A and the second processed portion 81B, and the roughness of the second processed portion 81B is rougher in comparison with the roughness of the first processed portion 81A. That is to say, when the surface processing (grinding) is performed for the raceway surface 21 of the slider 2 by using this grindstone 8, the surface roughness of the second raceway surface 21B can be set rougher in comparison with the surface roughness of the first raceway surface 21A. Here, the second raceway surface 21B is processed by the second processed portion 81B in which the roughness is large in the grindstone portion 81. The grindability is higher as the roughness of the grindstone portion is rougher.

Therefore, in accordance with this embodiment, a deterioration of the grindability on the second raceway surface 21B can be prevented, and as a result, the time required for the grinding can be shortened, and the degradation due to the heat generation can also be prevented.

Note that, if the purpose is only to enhance the grinding capability of the grindstone 8, then it is conceived to increase the roughness of both of the first processed portion 81A and the second processed portion 81B.

However, when the grindstone 8 as described above is adopted, the roughness of the first processed portion 81A becomes rougher than an appropriate value, resulting in a possibility that abrasion and damage of the first raceway surface 21A may become prone to occur.

In this embodiment, the roughness of the first raceway surface 21A can be kept appropriately, and accordingly, such a problem does not occur.

Second Embodiment

Next, a description is made of a second embodiment of the production method for the linear motion guide device with reference to the drawings. Note that this embodiment is different from the first embodiment only in a form of the rotary dresser that forms the grindstone 8 for use in the surface processing step, and accordingly, a description of constituents, which are similar to those of the above-mentioned embodiment and are denoted by the same reference numerals as those thereof, is sometimes omitted.

Figure 11A:
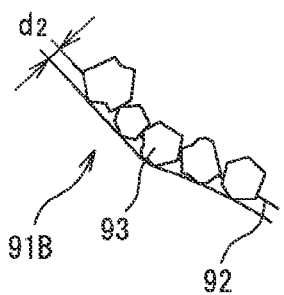
FIG. 11A is an enlarged view of a first processed portion in a second embodiment of the production method for a linear motion guide device.
Figure 11B:
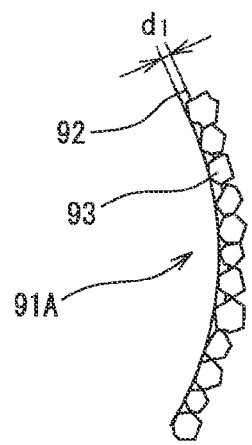
FIG. 11B is an enlarged view of a second processed portion in the second embodiment of the production method for a linear motion guide device.

FIG. 11A is an enlarged view of a first surface of a rotary dresser in this embodiment, and FIG. 11B is an enlarged view of a second surface of the rotary dresser in this embodiment. As illustrated in FIGS. 11A and 11B, in this embodiment, not the protrusion amount of the abrasive grains 93 (for example, diamond) is changed between the first surface 91A and the second surface 91B, but the (average) grain diameter of the abrasive grains 93 may be changed between the first surface 91A and the second surface 91B. For example, preferably, the grain diameter of the abrasive grains 93 of the second surface 91B ranges approximately from 1.5 to 3 times the grain diameter of the abrasive grains 93 of the second surface 91A.

As described above, the grain diameter of the abrasive grains 93 on the second surface 91B is set larger than the grain diameter of the abrasive grains 93 on the first surface 91A, whereby the protrusion amount of the abrasive grains 93 on the second surface 91B can be set larger than the protrusion amount of the abrasive grains 93 on the first surface 91A. Then, with regard to the grindstone 8 molded by using the rotary dresser 9 as described above, the roughness of the second processed portion 81B that grinds the second raceway surface 21B becomes rougher than the roughness of the first processed portion 81A.

Hence, in a similar way to the first embodiment, such a linear motion guide device can be fabricated, which includes the slider in which the surface roughness of the second raceway portion 21B is rougher than the surface roughness of the first raceway portion 21A.

Third Embodiment

Next, a description is made of a third embodiment of the production method for the linear motion guide device with reference to the drawings. Note that this embodiment is different from the first embodiment only in a form of the grindstone 8 for use in the surface processing step, and accordingly, a description of constituents, which are similar to those of the above-mentioned embodiment and are denoted by the same reference numerals as those thereof, is sometimes omitted.

Figure 12:
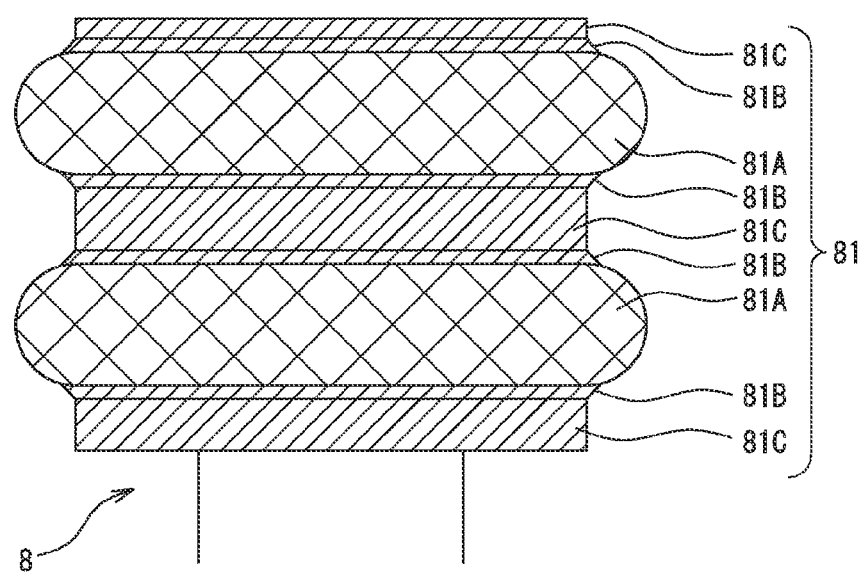
FIG. 12 is a side view illustrating a configuration of a grindstone in a third embodiment of the production method for a linear motion guide device.

FIG. 12 is a side view illustrating a configuration of a grindstone in this embodiment. As illustrated in FIG. 12, in this embodiment, the protrusion amount of the abrasive grains 93 (for example, diamond) in the rotary dresser (not illustrated) that molds the grindstone 8 is made uniform, and granularity of the grindstone portion 81 is made nonuniform. That is to say, the grindstone 8 of this embodiment is composed in such a manner that the second processed portion 81B and the third processed portion 81C, which compose the grindstone portion 81, are formed as a grindstone portion with small granularity, the first processed portion 81A is formed as a grindstone portion with large granularity, and both thereof are alternately sandwiched and integrated with each other. That is to say, the granularity of the second processed portion 81B and the third processed portion 81C, which grind the second raceway surface 21B of the slider 2 is smaller than the granularity of the first processed portion 81A. Note that, in FIG. 12, with regard to the respective processed portion, such portions thereof composed with different grain diameters are illustrated with different types of hatching.

In this embodiment, the granularity of the grindstone ranges approximately from #30 to #400 in terms of mesh granularity. As the granularity is larger, the grain diameter is smaller. Moreover, preferably the granularity of the second processed portion 81B and the third processed portion 81C ranges approximately from 0.2 to 0.8 times the granularity of the first processed portion 81A.

The surface processing step is performed by using this grindstone 8, whereby the surface roughness of the second raceway surface 21B of the slider 2 of the linear motion guide device can be set rougher than the surface roughness of the first raceway surface 21A.

Fourth Embodiment

Next, a description is made of a fourth embodiment of the production method for the linear motion guide device with reference to the drawings. Note that this embodiment is also different from the third embodiment only in the form of the grindstone 8 for use in the surface processing step, and accordingly, a description of constituents, which are similar to those of the above-mentioned embodiment and are denoted by the same reference numerals as those thereof, is sometimes omitted.

Figure 13:
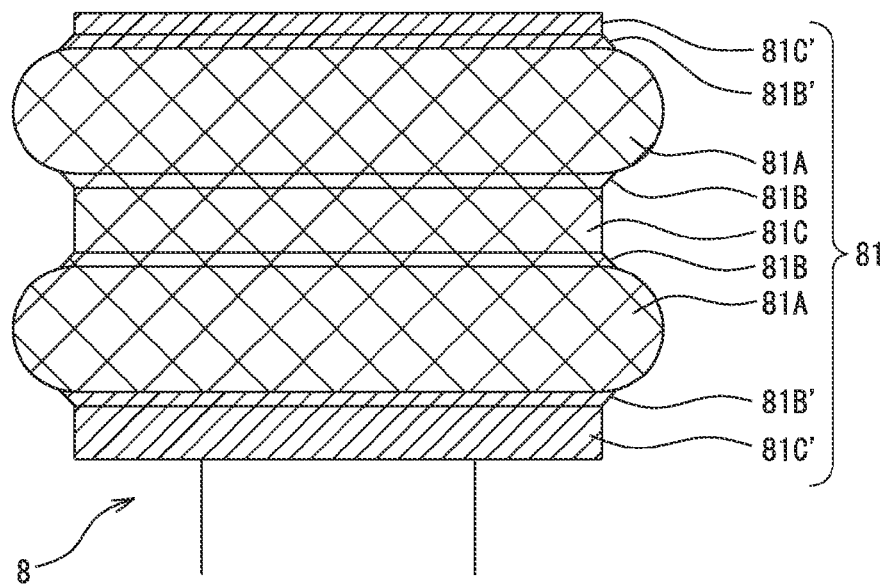
FIG. 13 is a side view illustrating a configuration of a grindstone in a fourth embodiment of the production method for a linear motion guide device.

FIG. 13 is a side view illustrating a configuration of a grindstone in this embodiment. As illustrated in FIG. 13, in this embodiment, the protrusion amount of the abrasive grains 93 (for example, diamond) in the rotary dresser (not illustrated) that molds the grindstone 8 is made uniform, and the granularity of the grindstone portion 81 is made nonuniform. That is to say, the grindstone 8 of this embodiment is composed in such a manner that, among the first processed portions 81A, the second processed portions 81B and the third processed portions 81C, which compose the grindstone portion 81, the second processed portions 81B (81B') and the third processed portions 81C (81C'), which are located on upper and lower ends going along the rotation axis of the grindstone 8, are formed as grindstone portions with small granularity, and the first processed portions 81A, the second processed portions 81B and the third processed portion 81C, which are sandwiched by these, are formed as grindstone portions with large granularity, and that these processed portions are integrated with each other. Note that, in FIG. 13, with regard to the respective processed portion, such portions thereof composed with different grain diameters are illustrated with different types of hatching.

In this embodiment, it is easier to configure the grindstone in comparison with the above-mentioned third embodiment, and accordingly, the production cost of the grindstone 8 can be reduced.

Here, as a modification example of the third embodiment, in addition to that the granularity of the grindstone is made nonuniform, the protrusion amount and grain diameter of the abrasive grains 93 of the rotary dresser 9 may be made nonuniform. In such a manner as described above, the grinding capability of the second processed portions 81B can be further enhanced.

Figure 14:
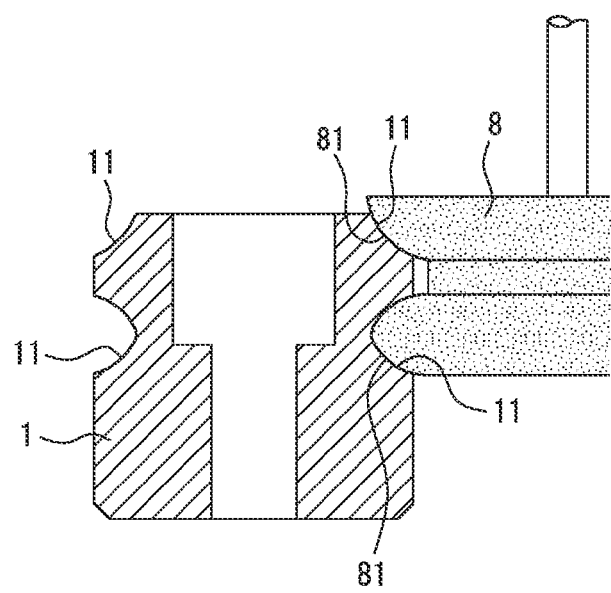
FIG. 14 is a side view illustrating a modification example of the production method for a linear motion guide device.

FIG. 14 is a side view illustrating a modification example of the production method for the linear motion guide device. In the above-mentioned embodiments, the surface processing (grinding) step for the raceway surfaces 21 of the slider 2 is mentioned; however, this may be applied to a surface processing (grinding) step for the raceway surfaces 11 of the guide rail 1.

Specifically, as illustrated in FIG. 14, there is used the grindstone 8 in which the plurality of grindstone portions 81 and 81, which transfer the first raceway surface (not illustrated) and the second raceway surfaces (not illustrated), are molded integrally with each other, and the raceway surfaces 11 and 11 of the guide rail 1 are subjected to the grinding finish (surface processing step) by moving the grindstone portions 81 and 81 in the longitudinal direction. This grinding finish (surface processing step) is performed, whereby the surface roughness of the second raceway surfaces of the guide rail 1 is made rougher than that of the first raceway surfaces. Note that, as mentioned above by using FIG. 4, this grindstone 8 is molded in such a manner that the grindstone portions 81 and 81 are subjected to the accurate truing by the rotary dresser 9.

As described above, also for the raceway surfaces 11 of the guide rail 1, similar effects to those in the above-mentioned case of implementing the surface processing step for the raceway surfaces 21 of the slider 2 can be obtained.

The description is made above of the present invention with reference to the specific embodiments; however, it is not intended to limit the invention by the description of these. For those skilled in the art, other embodiments of the present invention are also obvious together with the variety of modification examples of the disclosed embodiments by referring to the description of the present invention. Hence, it should be understood that the scope of claims covers modification examples or embodiments of these included in the scope and spirit of the present invention.

REFERENCE SIGNS LIST 1 guide rail
2 slider
21 raceway surface
21A first raceway surface
21B second raceway surface
3 rolling path
4 rolling element
8 grindstone
9 rotary dresser

The invention claimed is:

1. A linear motion guide device comprising a guide rail, a slider, and a plurality of rolling elements, wherein,
    the guide rail and the slider individually have raceway surfaces, which form a rolling path of the rolling elements, at positions opposite to each other,
    the raceway surfaces extend in a longitudinal direction of the guide rail,
    the rolling elements are disposed in the rolling path, and the slider moves with respect to the guide rail via the rolling elements, and
    the raceway surface of at least one of the slider and the guide rail includes a first raceway surface extending in the longitudinal direction, and second raceway surfaces extending on both sides in the longitudinal direction of the first raceway surface, and surface roughness of the second raceway surfaces is set rougher than surface roughness of the first raceway surface.

2. The linear motion guide device according to claim 1, wherein center line average roughness of the second raceway surfaces is 1.5 to 3 times center line average roughness of the first raceway surface.

3. A production method for a linear motion guide device comprising:
    a surface processing step of implementing surface processing for a raceway surface extending along a longitudinal direction of at least one of a slider and a guide rail; and
    an assembly step of disposing a plurality of rolling elements in a rolling path for rolling elements, which is formed of the raceway surface of the slider and the raceway surface of the guide rail, which is provided opposite to the raceway surface of the slider, and assembling the guide rail and the slider with each other so that the slider can be movable with respect to the guide rail via the rolling elements, wherein the surface processing step is a step of performing the surface processing at one time by a same grindstone so that the raceway surface of at least one of the slider and the guide rail includes a first raceway surface extending in the longitudinal direction, and a second raceway surface extending on both sides of the longitudinal direction of the first raceway surface, and that surface roughness of the second raceway surfaces is rougher than surface roughness of the first raceway surface.

4. The production method for a linear motion guide device according to claim 3, the production method further comprising:

a grindstone molding step of molding the grindstone by a rotary dresser, wherein a protrusion amount of abrasive grains or a grain diameter of the abrasive grains in regions of the rotary dresser, the regions corresponding to the second raceway surfaces, is made larger than a protrusion amount of the abrasive grains or a grain diameter of the abrasive grains in a region corresponding to the first raceway surface.

\* \* \* \* \*